UNITED STATES PATENT OFFICE.

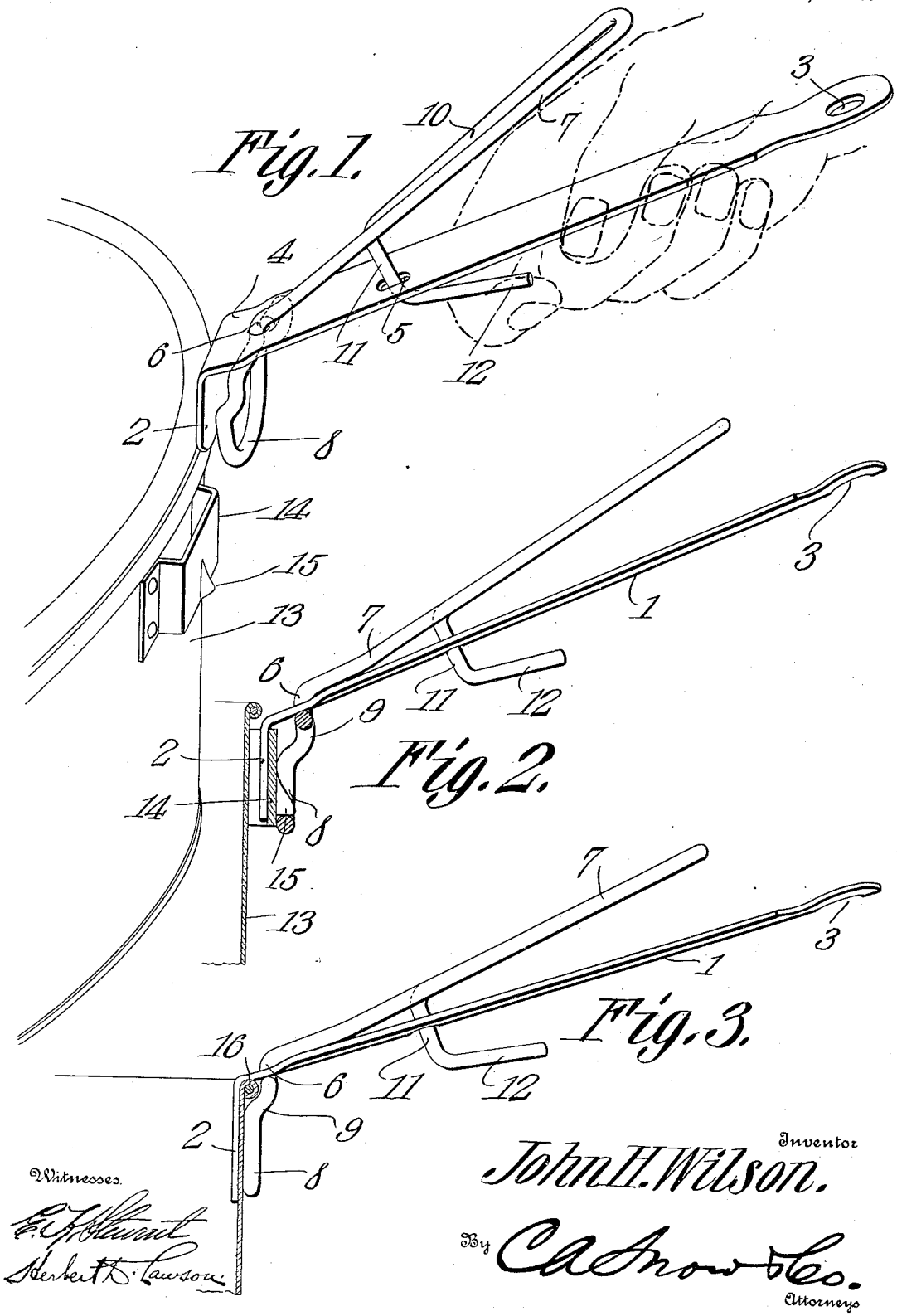

JOHN H. WILSON, OF NEW KENSINGTON, PENNSYLVANIA.

HANDLE FOR COOKING UTENSILS.

945,659.  Specification of Letters Patent.  Patented Jan. 4, 1910.

Application filed December 8, 1908. Serial No. 466,550.

*To all whom it may concern:*

Be it known that I, JOHN H. WILSON, a citizen of the United States, residing at New Kensington, in the county of Westmoreland and State of Pennsylvania, have invented a new and useful Handle for Cooking Utensils, of which the following is a specification.

This invention relates to removable handles for cooking utensils and its object is to provide a simple and efficient device of this character particularly designed for use in connection with "triple sauce-pans," although it is capable of being used in connection with various other forms of utensils such as ordinarily provided with handles fixedly attached to them.

In sauce-pans of the kind referred to it has heretofore been customary to provide each of the pans with a handle of its own and these handles take up a great deal of space when the pans are in position upon a stove. By providing a detachable handle however one handle can be used in connection with all of the pans and the space ordinarily occupied by the integral handles can thus be used for other purposes.

Another object is to provide a removable handle which can be conveniently operated so as to place it in position upon a utensil and clamp it thereon, this operation being performed entirely by one hand.

With the above and other objects in view the invention consists of certain novel details of construction and combinations of parts hereinafter more fully described and pointed out in the claims.

In the accompanying drawings the preferred form of the invention has been shown.

In said drawings:—Figure 1 is a perspective view of a portion of a utensil and of the detachable handle in connection therewith, the handle being shown in a position occupied by it immediately prior to being applied to the utensil. Fig. 2 is a section through the handle and the adjoining portion of the utensil and showing said handle in position upon the utensil. Fig. 3 is a side elevation of the handle, the same being shown in engagement with the wall of the utensil.

Referring to the figures by characters of reference, 1 designates an elongated substantially flat strip constituting the body of the handle, said strip having one end portion extended at an angle therefrom to form a jaw 2. An aperture 3 may be formed in the other end portion of the member 1 so as to enable the entire device to be suspended from a nail or other supporting structure. Another opening 4 is formed in the member 1 close to the jaw 2 and a short slot 5 is arranged within said member 1 at a point between its ends. The opening 4 is designed to receive a neck 6 extending at an angle from a lever 7 preferably formed of wire, said neck extending from the center of the straight side of a substantially D-shaped jaw 8, the upper or straight edge portion of which is preferably slightly depressed or off-set as indicated at 9 for the purpose hereinafter set forth. That end portion of the lever 7 which is farthest removed from the jaw 8 is looped back as indicated at 10 and provided with a terminal portion 11 extending substantially at right angles therefrom and movably mounted in the slot 5, said terminal portion having a finger 12 extending at an angle therefrom and under the member 1, said finger constituting a lifting device for facilitating the shifting of the lever 7 as hereinafter set forth.

If desired, and as shown in Fig. 1, the utensils with which the handle is to be used can be provided with suitable means for engagement by the handle. The utensil 13 shown in Fig. 1 has a strap 14 extending outwardly from the wall thereof and close to the top of the utensil, the space inclosed by this strap being sufficiently large to permit the jaw 2 to be inserted thereinto. A nose or stud 15 is struck outwardly from the lower portion of the strap at the middle thereof so that when said strap is gripped between the jaws 2 and 8 said jaw 8 will loop under the nose 15 and the handle is thus prevented from becoming accidentally released from the utensil should the parts be inadvertently grasped loosely.

In using the herein-described handle the operator grasps the member 1 and pushes upwardly on the finger 12 with the forefinger of the hand holding the handle. The lever 7 will thus be swung away from the member 1 and the jaw 8 moved away from the jaw 2. Said jaws can then be placed in position upon the strap 14, said strap assuming a position between them and with the nose 15 projecting into the jaw 8. The operator then reaches upwardly with the thumb and grasps the lever 7 and draws it toward the member 1. The jaw 8 will thus tightly bind the strap 14 against the jaw 2 and the utensil can therefore be conveniently lifted.

It is of course to be understood that it is not necessary to use straps such as shown at 14 in order to utilize the handle herein described. Said handle can be used equally as well simply by placing the jaws in engagement with the wall of a utensil. This means of using the handle has been clearly indicated in Fig. 3. It is merely necessary to spread the jaws apart in the manner hereinbefore described and to place them at opposite sides of the wall of the utensil. When the jaws are drawn together they clamp said wall and the off-set portion 9 allows the finishing bead 16, which is usually provided upon utensils, to rest between the jaws without interfering with their clamping action. By utilizing the off-set portion 9 for extending under the bead 16 of a utensil said bead acts as a stop to prevent the jaw 8 from accidentally slipping out of engagement with the utensil should the lever 7 be loosened or partly released from any cause while the utensil is being carried by means of the handle.

When the handle herein described is used in connection with "triple sauce-pans" it becomes necessary for the operator to reach over the outer pans in order to place the handle in engagement with the receptacle provided for it. This operation however can be greatly facilitated by grasping the lever 7 and permitting the member 1 to swing downward by gravity, thus opening the jaws so that they can be easily placed in position upon the utensil. Then, by grasping the member 1 and drawing it toward the lever 7 the jaws can be caused to firmly grip the pan and it can thus be removed from the fire without danger of dropping from the handle.

Obviously various changes may be made in the construction and arrangement of the parts without departing from the spirit or sacrificing the advantages of the invention.

What is claimed is:—

1. A device of the class described comprising pivotally connected jaw-carrying members and a lifting device integral with and extending angularly from one of the members.

2. A device of the class described comprising a main jaw-carrying member, a second jaw-carrying member extending therethrough and movable relative thereto, and a lifting device integral with and extending angularly from said second member.

3. A device of the class described comprising pivotally connected members, coöperating clamping jaws carried thereby, and a combined guide and lifting device upon and extending angularly from one of the members.

4. A device of the class described comprising pivotally connected members, clamping jaws integral therewith, a guide arm extending angularly from one of said members and movably engaging the other member, and a lifting finger upon said arm.

5. A device of the class described comprising movably connected members, said members having coöperating clamping jaws, there being an opening within one of the members, a guide arm extending angularly from the other member and movably mounted within the opening, said arm having an integral lifting finger.

6. A device of the class described comprising a main handle member, a jaw integral therewith, a lever pivotally connected to the main handle member, a jaw integral with said lever and coöperating with the first mentioned jaw, and a combined guide and lifting device extending angularly from the lever and coöperating with the handle member.

7. A device of the class described comprising a main handle member, a jaw integral therewith, a lever pivotally connected with the handle member, a looped jaw integral with the lever, a guide arm extending angularly from the lever and movably mounted within the handle member, and a lifting finger upon said arm.

8. The combination with a utensil having an outstanding strap thereon and a projection upon the strap; of a handle detachably engaging the strap and comprising a main handle member, a jaw thereon, a lever movably connected to the handle member, a looped jaw thereon detachably engaging the projection, said strap extending between the jaws.

9. The combination with a utensil having an outstanding strap thereon and a projection upon the strap; of a handle detachably engaging the strap and comprising a main handle member, a jaw thereon, a lever movably connected to the handle member, a looped jaw thereon detachably engaging the projection, said strap extending between the jaws, and a lifting device extending from the lever, said handle member extending between the lifting device and the lever.

10. A device of the class described comprising a main handle member having an opening therein adjacent one end, a jaw integral with said member and extending from said end, a lever, a neck extending at an angle therefrom and movably mounted within said opening, and a jaw integral with said neck, said jaw and lever bearing upon opposite faces of the main handle member to prevent the neck from sliding within the opening.

11. A device of the class described comprising a flat jaw-carrying member having spaced openings therein, a second jaw-carrying member movably mounted within one of the openings and having a guide portion integral therewith and extending at an angle therefrom and slidably mounted within the other opening, said guide portion terminating in a lifting finger.

12. A device of the class described comprising a jaw-carrying member having spaced openings therein, a second jaw-carrying member extending through and mounted to rock within one of the openings, and a lifting device integral with said second member and movably mounted within the other aperture, said apertured member being extended between one terminal portion of the lifting device and its jaw-carrying member.

13. A device of the class described comprising a flat jaw-carrying member having spaced openings therein, and a wire-jaw-carrying member extending through one of the apertures and looped at one end to constitute a jaw and folded at its other end to constitute a grip, said folded portion having a guide arm extending therefrom and movably mounted within the other aperture, said guide arm terminating in a lifting finger.

14. A device of the class described comprising a jaw-carrying member having spaced openings therein, a second member extending through and disposed to rock within one of the openings and terminating in a D-shaped jaw, said last mentioned member being folded and having an integral guide arm extending at an angle therefrom and movably mounted within the other opening, said guide arm terminating in a lifting finger.

15. In a device of the class described a jaw-carrying member having spaced openings therein, a second member extending through and mounted to rock within one of the openings, said member terminating at one end in a jaw, an arm extending at an angle from said member and movably mounted within the other opening, said arm terminating in a lifting finger, the apertured member being disposed at all times between the lifting finger and its jaw-carrying member.

In testimony that I claim the foregoing as my own, I have hereto affixed my signature in the presence of two witnesses.

JOHN H. WILSON.

Witnesses:
J. L. McCammon,
E. D. Cree.